United States Patent [19] [11] 3,777,913
Schieser et al. [45] Dec. 11, 1973

[54] MACHINE FOR REMOVAL OF BOTTLES FROM SHIPPER BAGS AND PLACEMENT THEREOF ON A CONVEYOR

[75] Inventors: Warren J. Schieser, Columbus; Stanley E. Vickers, Hideaway Hills, both of Ohio

[73] Assignees: Corco, Inc., Worthington, Ohio

[22] Filed: July 28, 1972

[21] Appl. No.: 276,098

[52] U.S. Cl. .............. 214/8.5 D, 198/35, 198/32, 214/1 Q, 214/304
[51] Int. Cl. .......................................... B65g 59/04
[58] Field of Search ................. 214/8.5 D, 8.5 C, 214/1 Q; 198/32

[56] References Cited
UNITED STATES PATENTS
3,669,283  6/1972  Brown .......................... 214/8.5 C
3,603,466  9/1971  Lingl ............................ 214/8.5 C
3,262,542  7/1966  McClelland .................... 198/32
3,557,932  1/1971  Laub ............................. 198/32

Primary Examiner—Gerald M. Forlenza
Assistant Examiner—George F. Abraham
Attorney—William V. Miller et al.

[57] ABSTRACT

A machine which receives a bag of double-stacked bottles and automatically unloads the bottles from the bag, after one end is opened, and places them on an unloader conveyor in a single layer. The bottles, for example, may be large single-service plastic bottles and the bag may be of flexible plastic film. The machine includes a transfer hopper in which the bag of double-stacked bottles is placed where the open-ended bag is stripped therefrom, and which is moved to an unstacking station to position the lower layer of bottles on the unloader conveyor. It also includes, at the unstacking station, a vacuum-lift rack which automatically rotates over the top layer of bottles, grips them by vacuum and moves over the conveyor to deposit the upper layer of bottles upright thereon behind the previously positioned lower layer. The bottles thus positioned on the unloader conveyor in the single layer may then be positioned, by movement of that conveyer, in single file on a feed conveyor which may be the loader conveyer of a bottle filler.

16 Claims, 10 Drawing Figures

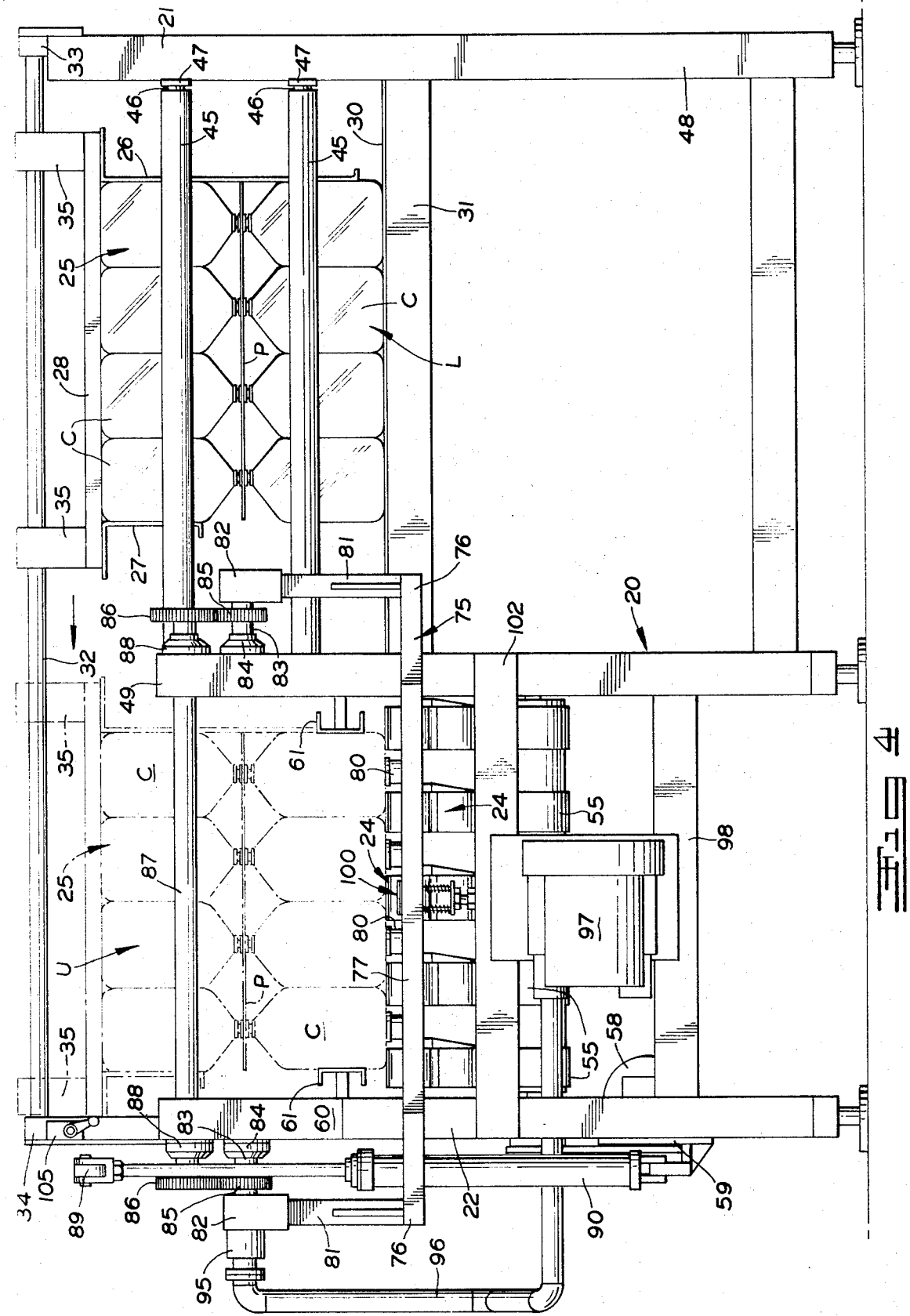

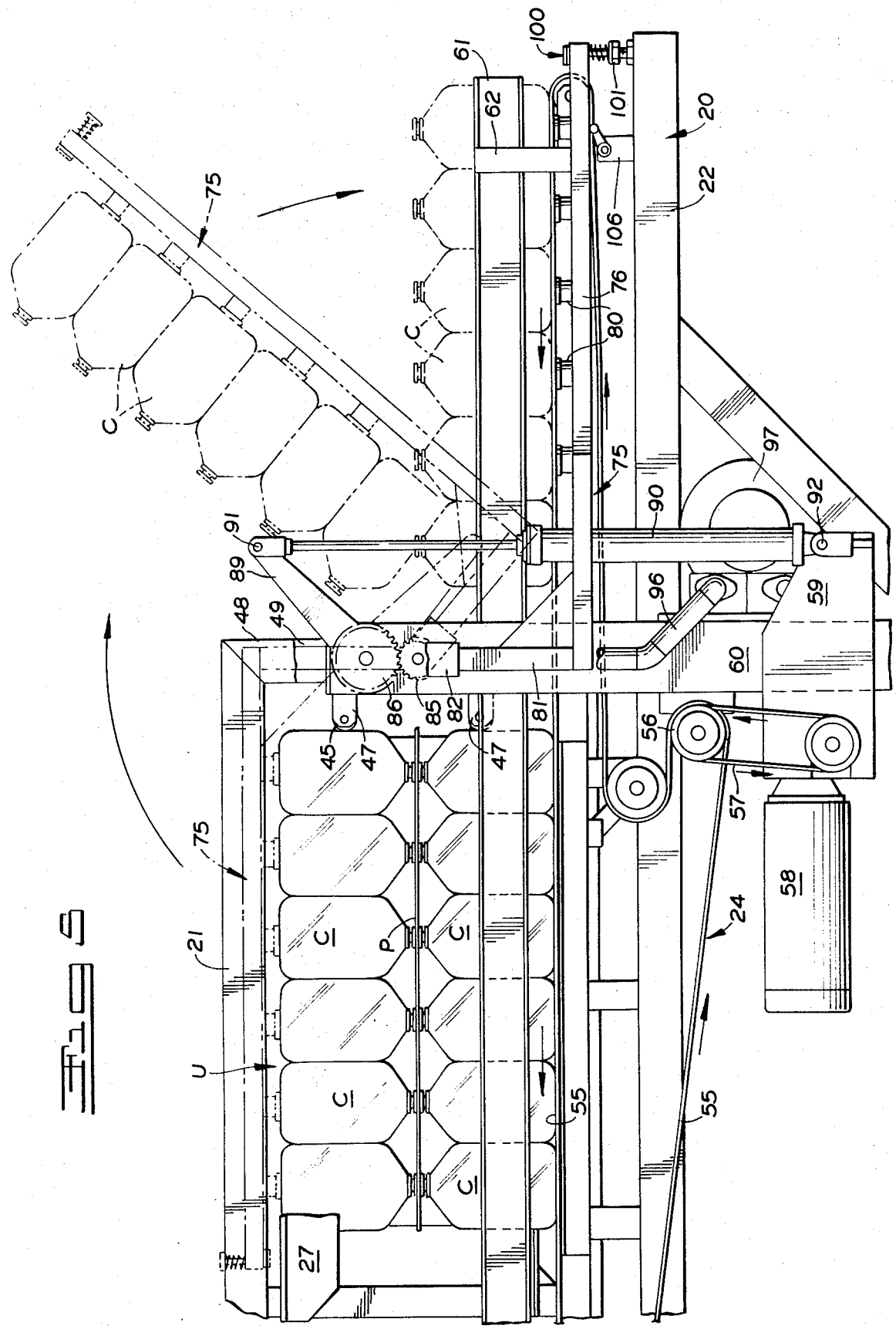

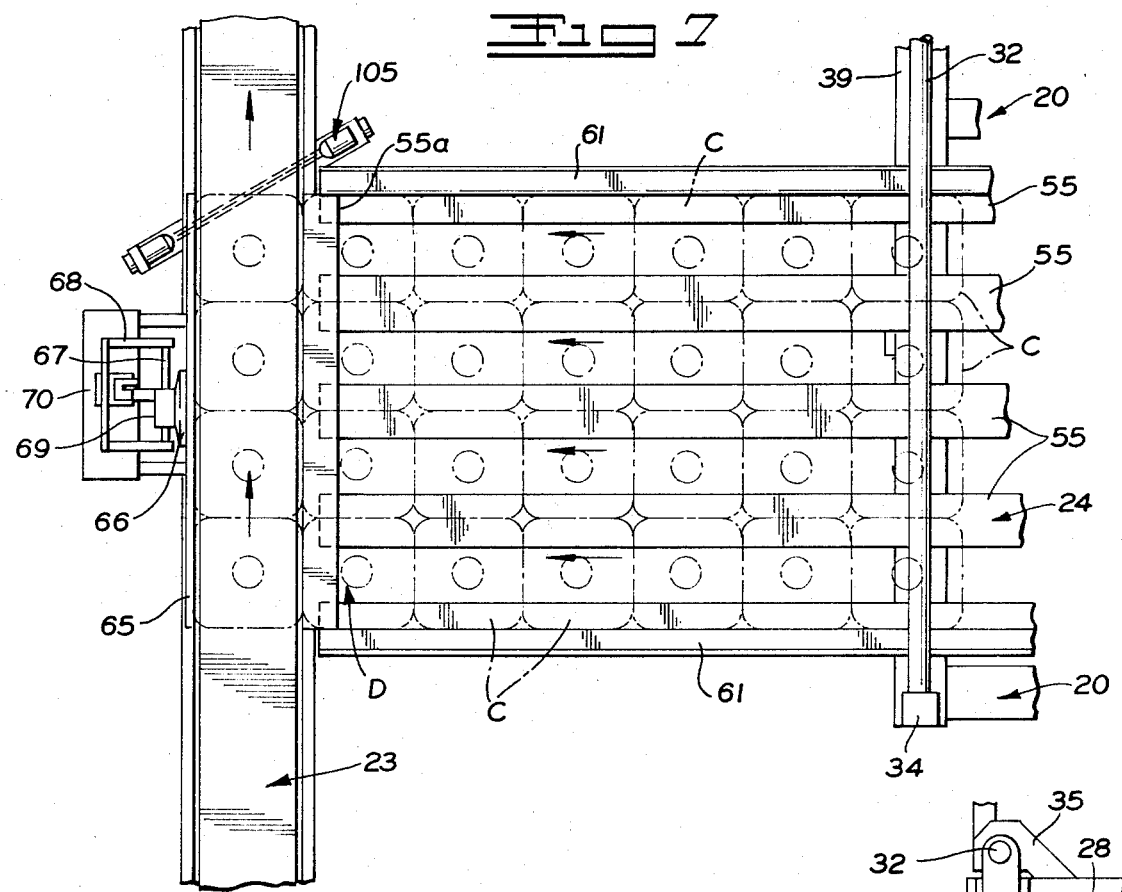
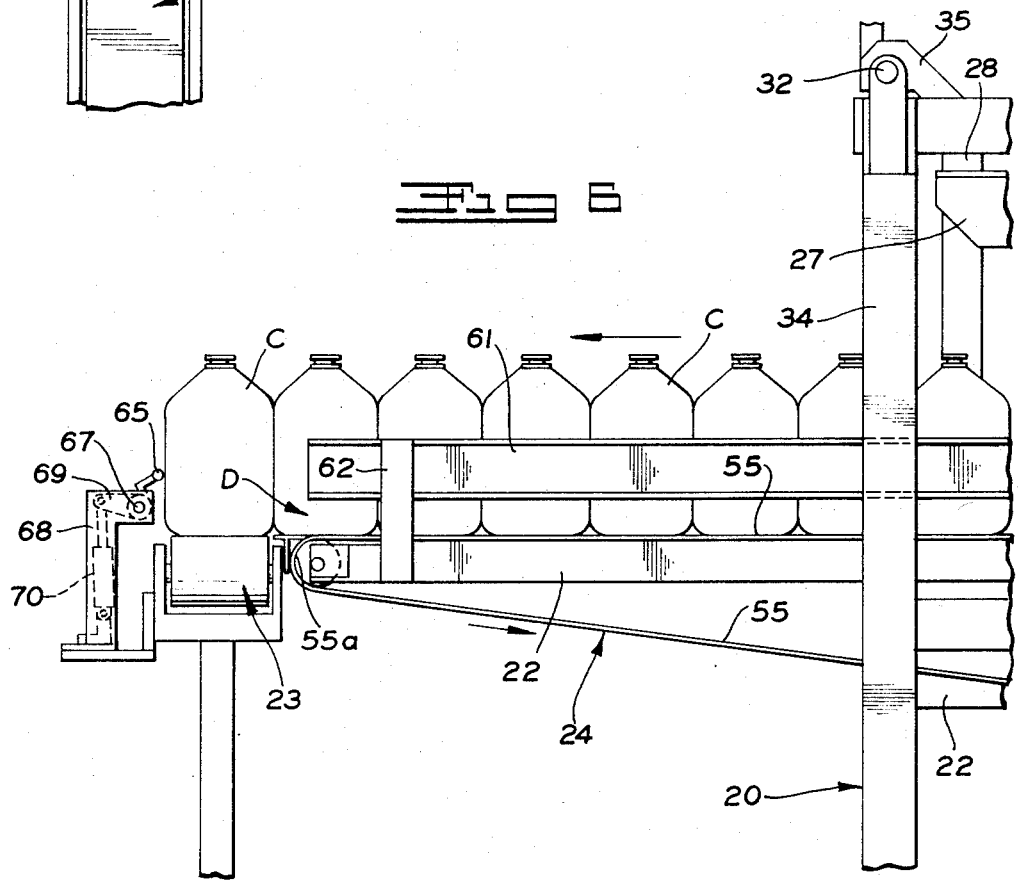

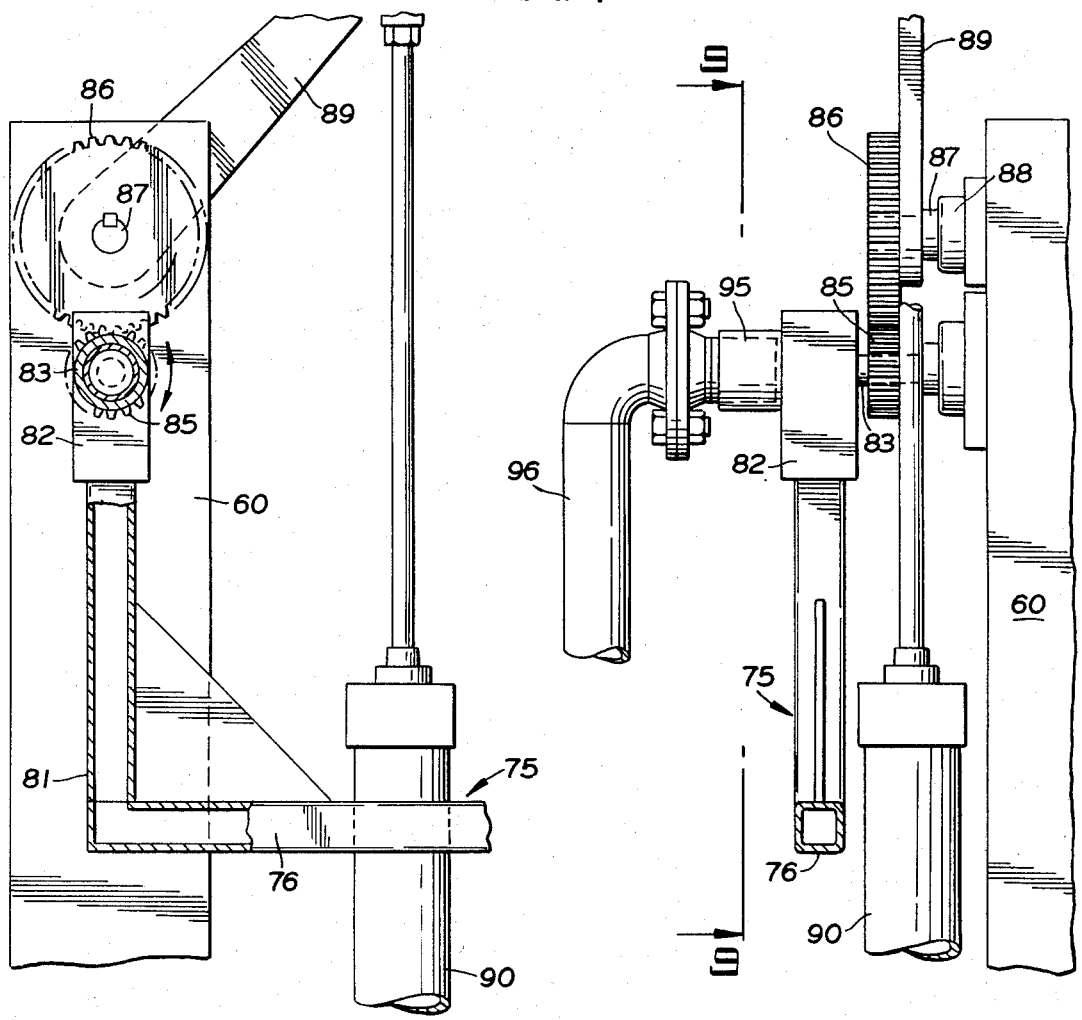
Fig. 9
Fig. 8
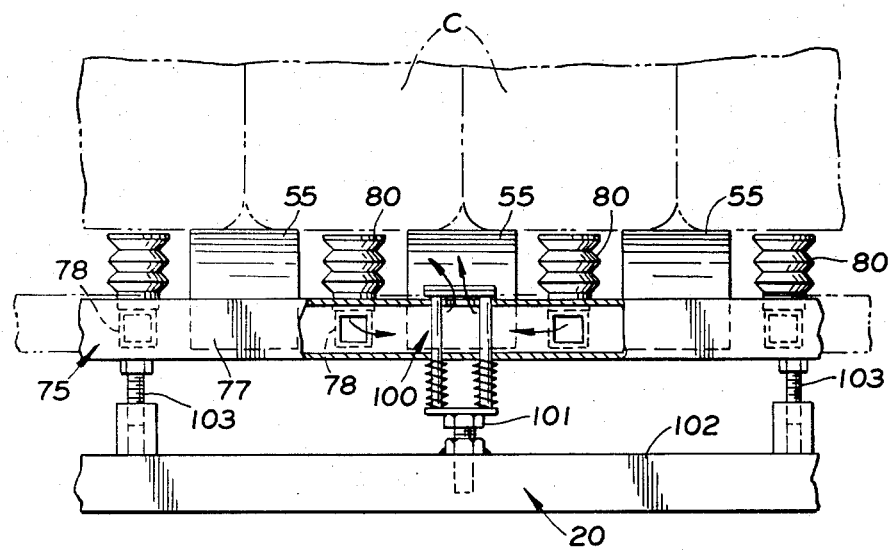
Fig. 10

MACHINE FOR REMOVAL OF BOTTLES FROM SHIPPER BAGS AND PLACEMENT THEREOF ON A CONVEYOR

Containers of the single-service plastic type are commonly supplied in bags of plastic film to various users where they are filled with liquids by filler machines. When the user receives these bag-packed containers, the bag must be opened and the containers must be removed by hand individually and placed on the filler machine, usually on a loader conveyor. Obviously this results in high labor costs and difficulty in maintaining sanitary conditions because of hand touching.

The present invention provides a machine which greatly facilitates the handling of bag-packed containers such as bottles. The machine automates most of the functions of removal of the bottles from the plastic shipper bag and the placement of bottles in single file on the filler machine conveyor. Labor costs are minimized and sanitary handling of the bottles is assured since the unloader eliminates hand touching of any of the bottle surfaces. One operator can easily keep pace with the fastest filler, and depending on the storage and handling conditions for the bagged bottles, can assume other duties associated with the filling and capping equipment. A secondary benefit occurs to the user by maintaining the bag in good condition so that it can be reused for the handling of waste materials, etc.

The best mode contemplated in carrying out this invention is illustrated in the accompanying drawings in which:

FIG. 4 is an enlarged end elevational view of the machine illustrating the movement of the transfer hopper over the unloader conveyor.

FIG. 5 is an enlarged side elevational view of a portion of the machine illustrating the movement of the vacuum-lift rack.

FIG. 6 is an enlarged side elevational view of a portion of the machine at the discharge end of the unloader conveyor indicating the movement of the bottles onto the loader conveyor.

FIG. 7 is a plan view of the portion of the machine shown in FIG. 6.

FIG. 8 is an enlarged vertical longitudinal sectional view taken along line 8—8 of FIG. 2.

FIG. 9 is a vertical sectional view taken along line 9—9 of FIG. 8.

FIG. 10 is an end view of the vacuum rack.

Figure 1:
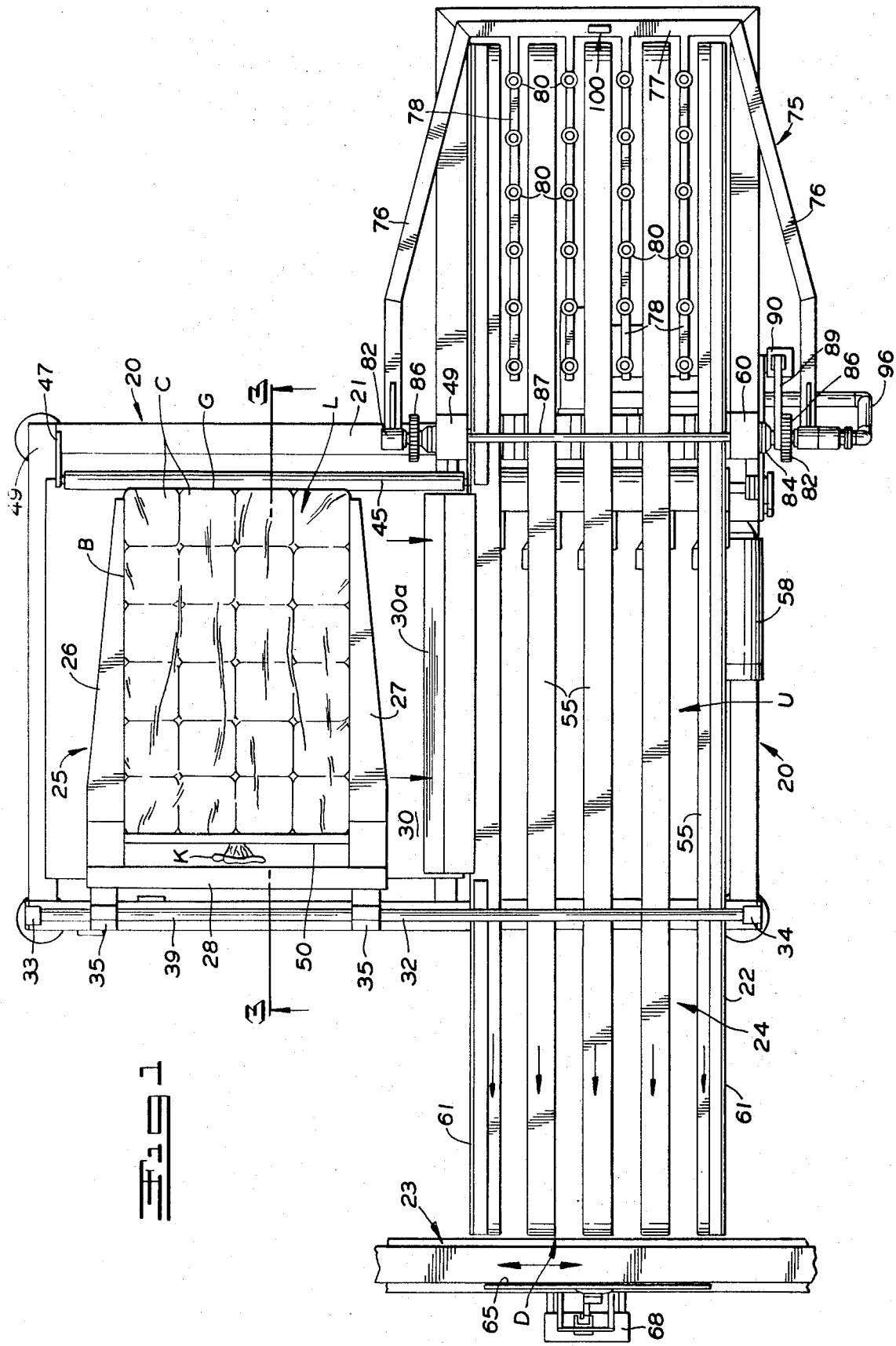
FIG. 1 is a plan view of the machine of this invention.
Figure 2:
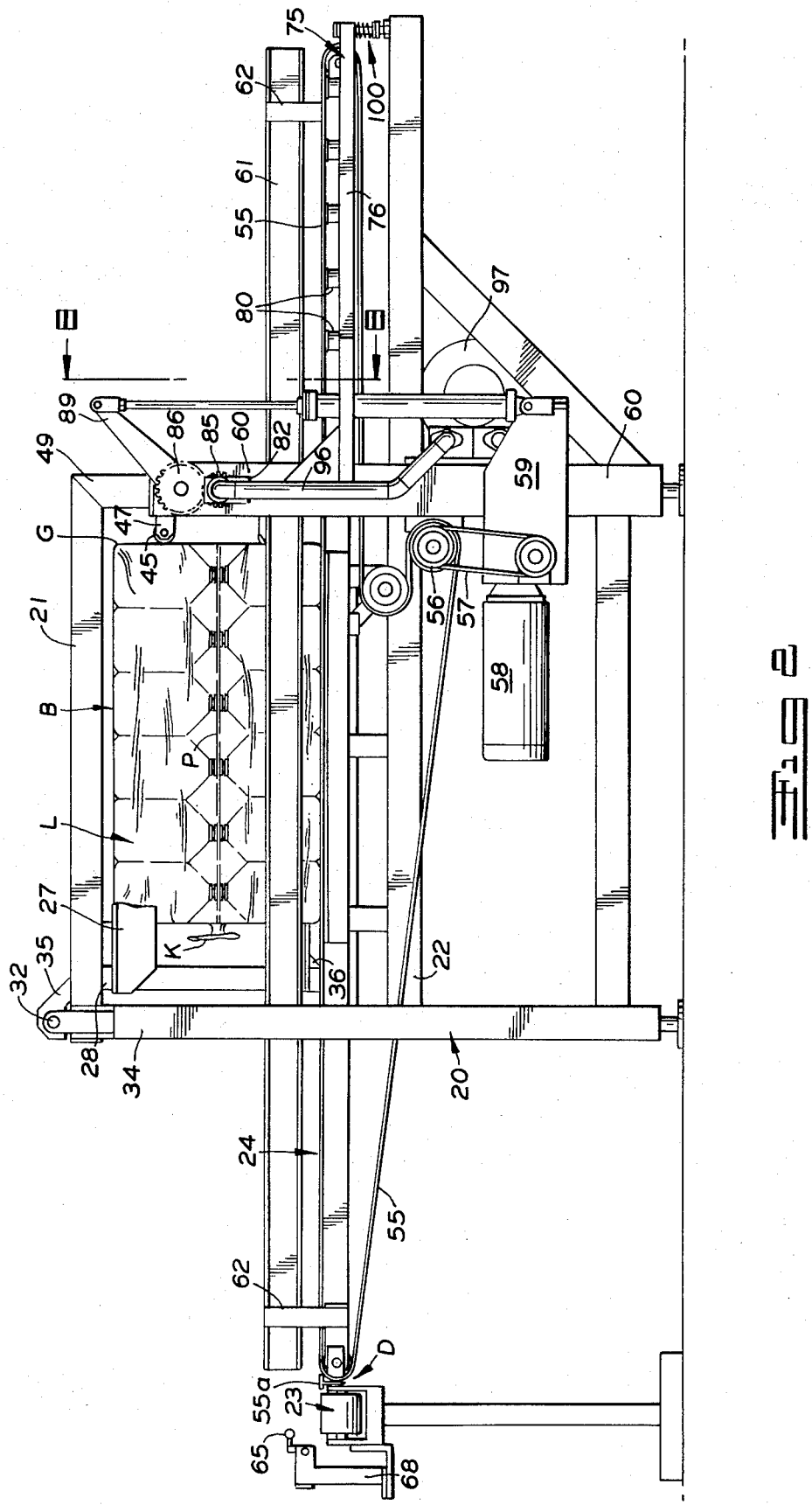
FIG. 2 is a side elevational view of the machine.

In the particular example shown in the drawings, the machine is designed to unload bottles or containers C of the large single-service type from the plastic shipper bag B in which they are packed. They are arranged in two layers with the necks of the bottles of each layer directed inwardly (FIG. 3), a removable partition board P separating the two layers. Each layer may consist of any number of rows of any selected number, four rows being shown (FIG. 1) with six bottles in each row. The bag B may have a bottom or integral closed gusset end G and an opposed end closed at a tied knot K. The loaded bag may be positioned on the machine so that the selected end can be opened. In the drawings it is shown positioned so that the knotted end is opened by a tearing or cutting operation.

The machine is shown as comprising a main frame 20 suitably fabricated, as shown in FIG. 1, to provide an upright laterally extending loading station support section 21 which is intermediate and extends from one side of a horizontal unloader conveyor support section 22 that extends longitudinally. At the one end of the support section 22 a conveyor 23 is located which leads transversely thereof and which will be loaded with a single file of the bottles C unloaded from the bag B and transferred thereto by the machine of this invention. This conveyor 23 may be the loading or feeding conveyor of a filler machine designed to fill the bottles C. The bottles are transferred on the machine from the loading station L on the frame section 21 to the discharge station D at the end of the frame section 22 where the conveyor 23 is located. During this transfer, the two layers of bottles are separated and are arranged upright in sequence on the unloader conveyor 24 and are fed to the loader conveyor 23 upon which they are discharged in single file.

As indicated in FIG. 1, at the loading station L, before the machine starts its operation, there is located the hopper 25 which receives a bag B of the bottles and the bag may be inserted in the hopper with the ends in either direction. In the drawings, the bag is shown positioned in the hopper with its knotted end K to the left (FIG. 1). The hopper is shown best in FIGS. 1 to 4.

The bag-packed bottles are loaded onto the machine at the station L when the hopper 25 is at that side of the machine, that is, on the lateral extension 21 of the frame 20. As will appear later, the loading of the filled bag into the hopper 25 occurs at the left end of the hopper (FIG. 1) and the removal of the bag occurs at the right end of the hopper. The operator therefore, moves from the left end, where he initially stands, to the right end where he stands during the cycle of operations of the machine.

Figure 3:
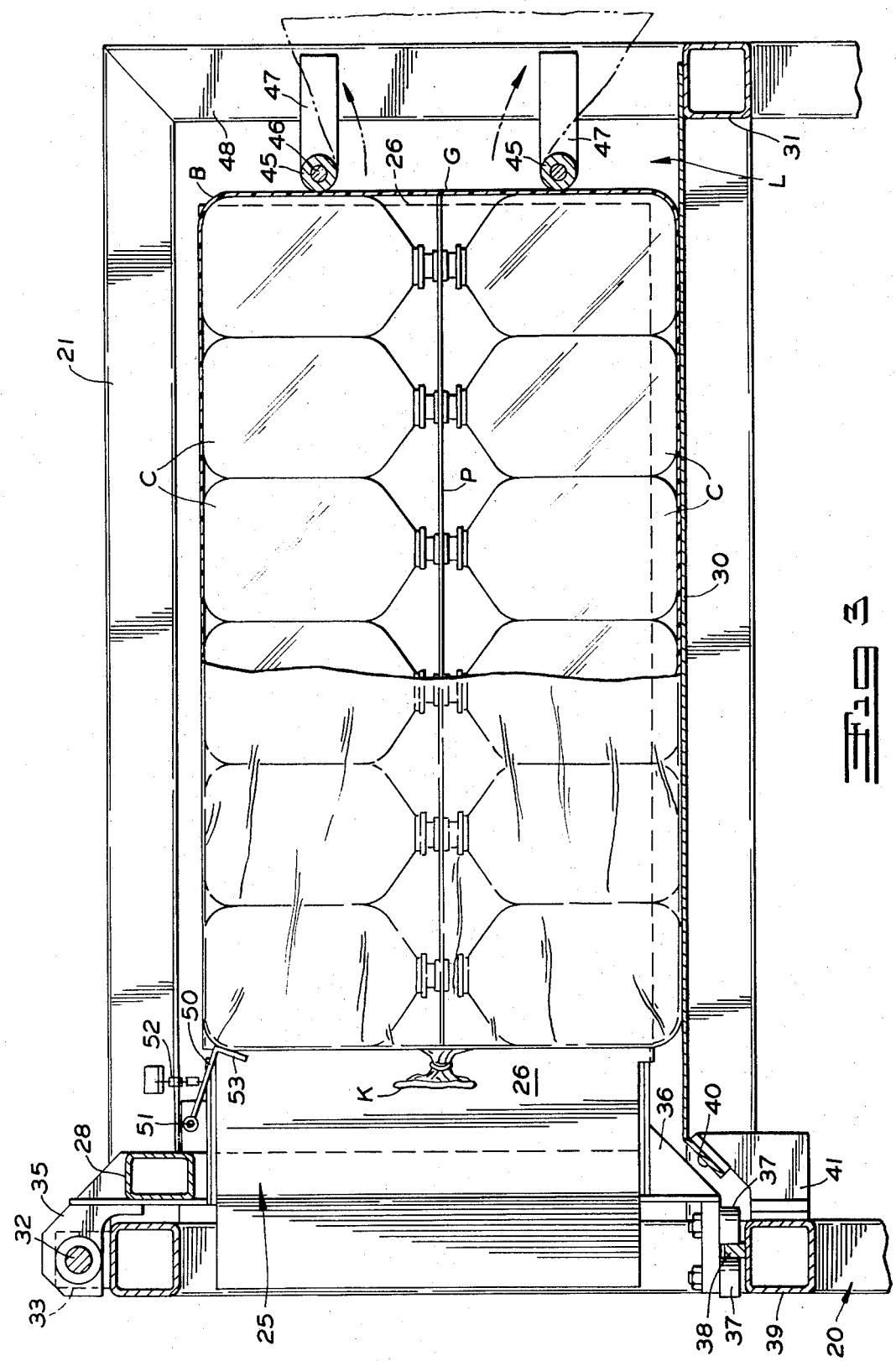
FIG. 3 is an enlarged vertical sectional view taken along line 3—3 of FIG. 1 through the transfer hopper.

The hopper 25 includes the longitudinally extending side members 26 and 27 which are held in spaced parallel relationship by a rear cross beam 28 rigidly connected to such members at their upper extremities. Thus, the hopper is yoke-shaped and faces to the right (FIG. 1) which may be termed the front of the machine. It will be noted (FIG. 4) that the outer side 26 of the hopper is deep and depends almost to the upper surface of a horizontal support plate 30 but, on the other hand, the side plate 27 is shallow and depends a distance less than the depth of the upper layer of containers C. The plate 30 provides a bottom for the hopper and is supported at the proper level by means including a forward cross beam member 31 which is a part of the frame extension 21. The yoke-shaped hopper is mounted for transverse movement of the machine on a trunnion rod 32 which extends from the outer side of the frame section 21, at the upper end of which it is supported, as indicated at 33, to the outer side of the frame section 22 where it is carried by an upstanding post 34. The cross beam member 28 of the hopper carries the pair of upstanding trunnion brackets 35 which mount the hopper 25 on the trunnion rod 32 for vertical swinging and axial sliding movement. At the rear end of the hopper and at the respective sides 26 and 27 thereof, the hopper is provided with depending rigid bearing support brackets 36 which are located beyond the rear end of the hopper bottom plate 30 and extend below the level thereof (FIG. 3). Each of these brackets carries a pair of rollers 37 mounted on vertical axis, each pair cooperating with an upstanding rib 38 on the upper surface of a beam 39 which extends from one side of the frame 20 to the other. It will be apparent that the rollers 37 cooperate with the rib 38 and vertical downward swinging of the hopper 25 around the axis of the trunnion 32 will be limited by contact of the forwardmost rollers 37 with the rib 38, as indicated in FIG. 3.

It will be noted (FIG. 3) that the rear edge of the hopper bottom plate 30 angles downwardly at 40 and is rigidly fixed to the trunnion beam 39 by support brackets 41. Thus, this plate will not interfere with transverse movement of the hopper on the trunnion rod 32. Adjacent the front edge of the support plate 30, stop rollers 45 are provided and extend transversely of the upstanding frame section 21, being disposed thereon at selected levels to engage the respective upper and lower layers of the containers C when the filled bag B is loaded into the hopper 25. The rollers 45 are mounted on the transverse shafts 46, carried by brackets 47 which extend inwardly from the outer post 48 of the frame section 21 and by an upstanding inner support post 49 of the frame section 22. The rollers 45 in effect form a front end for the hopper 25 with the members 26 and 27 forming the longitudinal sides. To form the rear end, a transversely extending pivoted baffle plate or gate 50 is provided. This plate extends between the members 26 and 27 and is hinged to the beam member 28 at 51 for vertical swinging movement. It normally hangs in forwardly and downwardly extending position, its lower position being limited by the chains 52 to a position where its forward angular lip 53 is below the top surfaces of the upper stack of containers C. It will be noted (FIG. 4) that rollers 45 do not extend over the unloader frame section 21.

In loading the hopper 25, with the hopper at the loading station L in FIG. 1, the filled bag B is pushed forwardly beneath the pivoted gate 50 between the sides 26 and 27. The plate will pivot upwardly and permit this insertion of the bag into the hopper 25. The bag will slide forwardly along the bottom plate 30 until its forward gusseted end G contacts with the stop rollers 45. At this time, the bag will be sufficiently forward that the gate 50 will drop downwardly so that its forward lip edge 53 will engage the rear side of the containers in the rear row of the upper layer. Thus, the bag will be surrounded at all its vertical surfaces so it will be kept in position in the hopper during the transfer operation. To remove the bag, the knotted end is untied and a forward pull is exerted on the gusseted end so as to strip the bag from the stack of containers, pulling it forwardly between the rollers which will serve to reduce friction at the levels of engagement with the bag. The bag is not destroyed and can be used thereafter for various purposes. After the bag is removed, the operator engages the hopper and pushes it transversely from the loading station L to an unstacking station U on the frame section 22 over the conveyor 24, this position being indicated in broken lines in FIG. 4. At this time, the lower layer of containers will rest on the conveyor 24, having been pushed off the plate 30 onto the conveyor. In moving from the plate 30 onto the conveyor 24, the containers slide across a bridge plate 30a shown in FIG. 1. Also, at this time the outer row of containers engages the rail 61.

It will be noted that the support level of the conveyor 24 is substantially the same as the level of the horizontal support plate 30. This conveyor is illustrated in FIGS. 1, 2, 4 and 5 and is composed of a series of laterally spaced endless belts 55. The belts are mounted on the frame section 22 so that their upper runs are in a common horizontal plane extending longitudinally of the frame section and, as previously indicated, at the same level as the hopper bottom plate 30. The means for mounting the belts 55 includes a driving roll 56 which is driven by a belt drive 57 from a motor 58 mounted by a bracket 59 (FIG. 2) attached to an outer post 60 at the outer side of the frame section 21. At the outer edge of the conveyor 24, longitudinally extending guide rod 61 is provided which extends substantially the full length thereof and is supported at a proper level by upstanding brackets 62 from the frame section 22 so as to engage the outermost row of containers when they move into and along the conveyor 24. The upper run of the conveyor 24 moves the containers supported thereby toward the conveyor 23 and it will be noted that the conveyor 23 may be an endless belt conveyor with its upper run substantially at the same level as the upper run of the conveyor 24. The conveyor 23 will travel at a right angle to the conveyor 24 and a bridging plate 55a may be provided between the upper runs of these conveyors.

The conveyor 23 has a stop rail 65 located along its outer edge at the discharge station D so as to engage the leading transverse row of containers as they are pushed off the outer end of the conveyor 24 so as to prevent them from dropping off the outer side of the conveyor 23. This rail 65 is shown best in FIGS. 7 and 8 and is carried by a bracket 66 which is mounted for vertical swinging movement about the axis of a shaft 67 to which it is keyed. This shaft is mounted parallel to the edge of the conveyor 23 on an upstanding support 68 carried by the frame of the conveyor 23. The shaft 67 may be rocked about its axis by means of the rocker arm 69 actuated by controlling the cylinder and piston unit 70 which is connected thereto.

When the hopper 25 is pushed by the operator from the loading station L to the unstacking station U over the conveyor 24, the lowermost layer of containers will rest on the conveyor 24 and it is necessary to invert and deposit the upper layer of containers on the conveyor 24. This is accomplished by the vacuum-lift rack which is indicated generally by the numeral 75 in FIGS. 1, 2, 4, 5 and 8 to 10. As previously indicated, the top of the hopper is completely open so that the upper layer of containers therein is exposed and also, at this time, the front rows of containers C of the two layers of the stack are exposed since they have moved beyond the stop rollers 45. This permits movement of the vacuum lift rack 75 in its unstacking operation without interference.

The rack 75 comprises an outer U-shaped frame portion which consists of the side arms 76 and the end brace 77 that carries the vacuum cup supporting arms 78, all these parts being in a common plane. When the rack is in its initial position, shown in FIG. 1, the arms 78 which are parallel, are located in the spaces between the belts 55 with the cups 80 carried thereby having their upper edges in substantially the same plane as the upper surfaces of the belts. A plurality of these cups is provided in longitudinally spaced relationship on each of the arms 78 and open upwardly. The number of cups on each arm and the spacing thereof corresponds to the number of containers and spacing of each longitudinal row of containers C in the stack. The cups are normally extended but will yield axially inwardly under pressure.

The U-shaped rack frame is pivoted for vertical swinging movement from the position shown in FIG. 1 and in full lines in FIG. 5, to an inverted position over the uppermost layer of containers in the stack which has been moved over the conveyor 24, as indicated by the broken line positions of FIG. 5. The inner end of the arms 76 are provided with rigidly connected pivot arms 81 which are at right angles or upstanding to the side arms 76. These arms at their upper ends are non-rotatably fixed at the fitting units 82 on the shafts 83 which extend outwardly in opposite directions from the respective posts 49 and 60 of the frame section 22 and are rotatably mounted in suitable bearings 84 thereon. Keyed on each of these shafts 83 is a gear 85 (FIGS. 8 and 9) which meshes with a second gear 86. The gears 86 are keyed on the oppositely projecting ends of a transverse rock shaft 87 which is also mounted in the posts 49 and 60 being rotatable in bearings 88 carried thereby. The shaft 87 is rocked by means of a rocker arm 89 keyed thereto and extending radially therefrom. The outer end of this arm is pivoted at 91 to the piston rod of a cylinder and piston unit 90 which has its cylinder pivoted at its lower end to the fixed bracket 59 as indicated at 92. Thus, actuation of the cylinder and piston unit will move the rack 75 between its two indicated positions.

The arms 78 are hollow and the cups 80 mounted thereon are in communication therewith. The cups are of flexible material and are capable of accordion-like extension and retraction. Each of the arms 78 communicates with the hollow cross-member 77 which, in turn, communicates with the hollow side members 76 and upstanding arms 81. One of the fittings 82 is connected at a coupling 95 to a pipe 96 for rotation relative thereto. This pipe extends below the conveyor 24 where it is connected to the intake of a blower 97 that is mounted on a support structure 98 fixed to the frame section 20. Operation of the blower will produce vacuum in the cups 80 of sufficient degree to lift the containers C when the cups 80 engage the bottoms thereof. These cups do engage the bottoms of the bottle containers of the upper inverted layer when the rack is swung to an inverted position over that layer as indicated in FIG. 5. When the rack is swung back to its original lower horizontal position it brings the layer of bottles with it and sets them upright on the belts 55 behind the lower layer which rests on the belts at this time, it being understood that the belts are stationary.

The cross-member 77 of the rack carries a vacuum release or dump valve 100 (FIG. 10) which is of the spring-plunger type and is normally closed. It is opened automatically to release the vacuum by striking an adjustable set-screw 101, carried by a transverse frame member 102, the opening occurring automatically as the rack 75 carries down into horizontal position. This will release the containers and if the conveyor 24 is now started, the belts 55 will move the unstacked containers on towards the conveyor 23. Adjustable stop screws 103 may be provided on the frame member 102 to limit the lowermost position of the rack 75.

To control the conveyor 24 so that a single transverse row of bottles is fed thereby onto the conveyor 23, a photoelectric cell unit 105 is provided as shown in FIG. 7 in an angular position so that its light beam extends across the conveyor 23 at the corner of the conveyor 24 which is toward the filler machine. Thus, the light beam is broken whenever a transverse row of containers is moved by the unloader conveyor 24 onto the loader conveyor 23, the leading container in the row breaking the light beam. The unit 105 controls the motor 58, to which it is suitably operatively connected so that the motor is stopped as long as the light beam is interrupted by the containers of the transverse row, previously pushed thereon, advancing therethrough. However, when the last container of the row has moved therethrough and the beam is reestablished, indicating the conveyor 23 is ready to receive containers, the motor will be actuated so that the conveyor 24 will be actuated to move another transverse row onto the conveyor 23. This will again break the photoelectric beam and stop the conveyor 24. Thus, the containers will be arranged in a single file on the conveyor 23.

At the same time that the unit 105 controls the motor 59 it will also actuate the guide rail cylinder and piston unit 70, to which it is operatively connected, so as to move the rack into position before the row of containers is moved from the conveyor 24 onto the conveyor 23. As the conveyor 24 stops, the guide rail 65 is retracted outwardly away from the row of containers on the conveyor 23.

The swinging movement of the unloader rack is by the actuating cylinder and piston unit 90, as previously indicated. The unit 90 may be actuated by a suitable solenoid valve (not shown) which is actuated by the switches 105. The switch 105 (FIG. 4) is located on the frame section 21 so that when the hopper is moved over the conveyor 24, it is engaged to actuate the unit 90 to swing the rack 75 upwardly over the upper layer of containers and then back down to its original position. The switch 106 is mounted on the frame section 21 so that it is engaged by the rack 75 when it reaches its original horizontal position in association with the conveyor 24. Movement of the conveyor 24 will also be controlled by the switch 106 so that it cannot occur unless the rack 75 has returned to its original horizontal position. The vacuum is controlled in accordance with the position of the rack 75 by the valve 100.

It will be apparent from the above that this invention provides a machine which automates most of the functions of removal of the containers or bottles C from the plastic shipper bag B and the placement of the bottles in a single file on the filler machine conveyor 23. The machine need merely be loaded with the bottles and the bag removed by the operator who pushes the hopper 25 laterally over the unstacking conveyor 24. The rest of the operations will be automatic, since the unstacker rack 75 will be automatically moved in its unstacking swinging operation. However, all the operations could be controlled manually by push-buttons. The conveyor 24 will be automatically controlled to supply the containers in single file by the photocell unit 105 which will be actuated, in accordance with the demand of the filler machine, by the last container passing it and reestablishing the light beam. This unit 105 will also control movement of the stop rail 65 associated with the conveyor 23. The vacuum is created by a simple blower 97 but other types of vacuum pumps could be used.

The machine of this invention will minimize labor costs and assure sanitary handling of the containers.

Having thus described the invention, what is claimed is:

1. A container unloading machine comprising a hopper for receiving a stack of the containers, an unloader conveyor, means for mounting said hopper for movement from a loading station at one side of the conveyor to an unstacking station over the conveyor when the lower layer of the stack of containers is deposited on the conveyor and an unstacking unit mounted in cooperation with the conveyor for lifting the upper layer of the stack of containers and depositing it on the conveyor, said hopper being designed to receive a bag of the containers packed with a plurality of stacked layers, the hopper being open at its bottom, a stationary plate at the loading station providing a lower support for the containers in the hopper and located at the one side of the conveyor, and a stop structure at the loading station at one end of the hopper for engaging the adjacent end of the packed bag but having a space through which the bag may be pulled to remove it from the containers, said stop structure comprising vertically spaced rollers transverse of the hopper for engaging the respective layers of containers, said rollers being fixed so that they do not move with the hopper and being located to the one side of the conveyor.

2. A machine according to claim 1 in which a gate is pivotally connected at the other end of the hopper for permitting insertion of the bag and then engaging the bag at the adjacent end of the upper layer of the containers therein.

3. A machine according to claim 1 in which the means for mounting the hopper comprises a trunnion rod extending from the loading station over and across the unloader conveyor, said hopper being provided with trunnion bearings at one end slidably and rotatably mounted on the rod at an upper level, and bearing rollers at a lower level cooperating with a guide rod extending parallel to said rod to limit vertical swinging of the hopper about the rod.

4. A machine according to claim 1 in which said unstacking unit comprises a rack pivoted for vertical swinging in cooperation with the unstacking conveyor for movement between a lower horizontal unloading position in association with the conveyor to an upper horizontal position over the upper layer of the transferred stacked containers, said rack having members for engaging the containers to lift them with the rack.

5. A container unloading machine comprising a hopper for receiving a stack of the containers, an unloader conveyor, means for mounting said hopper for movement from a loading station at one side of the conveyor to an unstacking station over the conveyor when the lower layer of the stack of containers is deposited on the conveyor and an unstacking unit mounted in cooperation with the conveyor for lifting the upper layer of the stack of containers and depositing it on the conveyor, said unstacking unit comprising a rack pivoted for vertical swinging in cooperation with the unstacking conveyor for movement between a lower horizontal unloading position in association with the conveyor to an upper horizontal position over the upper layer of the transferred stacked containers, said rack having members for engaging the containers to lift them with the rack, said container-engaging members being vacuum cups, and a vacuum-producing system connected to said cups.

6. A machine according to claim 5 in which means is provided for controlling the vacuum in accordance with the position of the rack.

7. A container unloading machine comprising a hopper for receiving a stack of the containers, an unloader conveyor, means for mounting said hopper for movement from a loading station at one side of the conveyor to an unstacking station over the conveyor when the lower layer of the stack of containers is deposited on the conveyor and an unstacking unit mounted in cooperation with the conveyor for lifting the upper layer of the stack of containers and depositing it on the conveyor, said unstacking unit comprising a rack pivoted for vertical swinging in cooperation with the unstacking conveyor for movement between a lower horizontal unloading position in association with the conveyor to an upper horizontal position over the upper layer of the transferred stacked containers, said rack having members for engaging the containers to lift them with the rack, said unloading conveyor comprising a plurality of longitudinally extending belts in laterally spaced relationship, said rack comprising a plurality of longitudinally extending arms carrying the container-engaging members at longitudinally spaced intervals, said arms in the lower horizontal position of said rack being disposed in said spaces between the belts with the article-engaging members below the top surfaces of the belts.

8. A machine according to claim 7 in which said container-engaging members are yieldable vacuum cups which open upwardly when the rack is in its lower position and open downwardly when the rack is in its upper position over the stack so as to engage the containers, and a vacuum-producing system connected to said cups.

9. A machine according to claim 8 in which the cups are normally extended but will fold inwardly under pressure.

10. A machine according to claim 7 in which the unstacking conveyor has a discharge station and a feed conveyor disposed transversely of the first conveyor at said discharge station for receiving containers therefrom and conducting them away.

11. A machine according to claim 10 in which the containers are received as a single transverse row from the unstacking conveyor and are conducted away in single file, and a stop rail movably mounted at the edge of the feed conveyor for engaging the said row as it is moved thereon, said stop rail being retractable from the conveyor out of engagement with the articles thereon.

12. A container unloading machine comprising a hopper for receiving a stack of the containers, an unloader conveyor means for mounting said hopper for movement from a loading station at one side of the conveyor to an unstacking station over the conveyor when the lower layer of the stack of containers is deposited on the conveyor and an unstacking unit mounted in cooperation with the conveyor for lifting the upper layer of the stack of containers and depositing it on the conveyor, said unstacking unit comprising a rack pivoted for vertical swinging in cooperation with the unstacking conveyor for movement between a lower horizontal unloading position in association with the conveyor to an upper horizontal position over the upper layer of the transferred stacked containers, said rack having members for engaging the containers to lift them with the rack, said unstacking conveyor having a discharge station and a feed conveyor disposed transversely of the first conveyor at said discharge station for receiving containers therefrom and conducting them away, the containers being received as a single transverse row from the unstacking conveyor and being conducted away in single file, a stop rail movably mounted at the edge of the feed conveyor for engaging the said row as it is moved thereon, said stop rail being retractable from the conveyor out of engagement with the articles thereon, and a photocell control unit located so that its light beam is broken by the containers of the row transferred thereto, said control unit being operatively connected to said unloading conveyor to control movement thereof and to said stop rail to control movement thereof.

13. A machine according to claim 12 in which said unstacking rack is pivoted for rocking movement about a horizontal axis, a cylinder and piston unit for swinging said rack about said axis, and control means for controlling said cylinder and piston unit.

14. A machine according to claim 13 in which said stop rail cooperating with the feed conveyor is mounted for swinging movement toward and from container-engaging position, a cylinder and piston unit for producing said swinging movement and control means for controlling said cylinder and piston unit.

15. A machine according to claim 14 including a control for starting the movement of the rack when the hopper is moved over the unstacking conveyor.

16. A machine according to claim 15 including a control for permitting movement of the unloader conveyor only when the rack has returned to horizontal position.

* * * * *